Patented Apr. 20, 1943

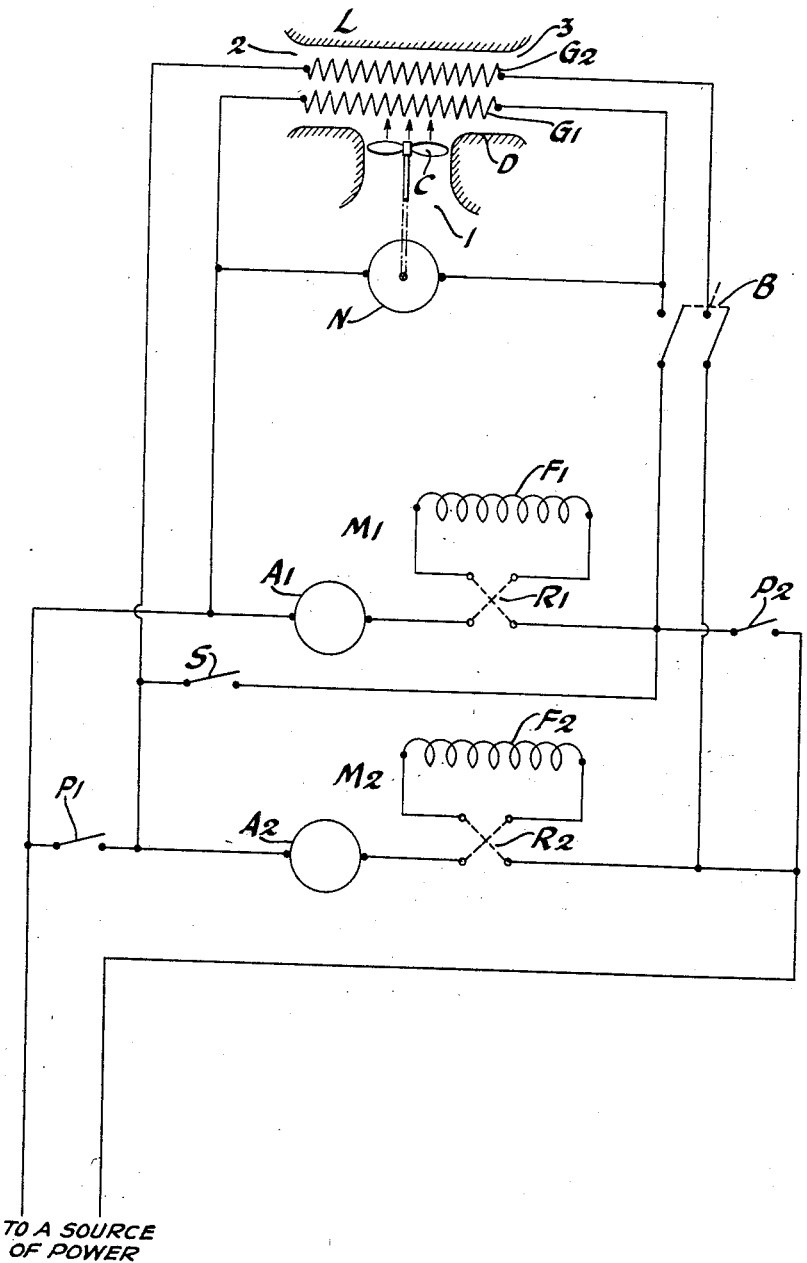

2,317,254

UNITED STATES PATENT OFFICE 2,317,254

DYNAMIC BRAKING SYSTEM

Stuart H. Cowin, Chicago, Ill., assignor to General Motors Corporation, Detroit, Mich., a corporation of Delaware Application December 12, 1940, Serial No. 369,818

2 Claims. (Cl. 172—179)

My invention relates to dynamic braking systems and more particularly to means for absorbing and dissipating electrical energy generated in retarding the movement of vehicles.

Dynamic braking systems for vehicles are generally used to supplement the retarding or braking action of mechanical braking systems of the friction type, as dynamic braking is ineffective at low values of vehicle speed. On vehicles supplied with electrical power from an overhead or third rail power conductor, regenerative braking may be employed but this type of braking is effective only when the regenerative voltage is higher than that of the power conductor, which occurs at the higher values of vehicles speed. At the lower values of vehicle speed the generated voltage is less than that of the power conductor and dynamic braking is sometimes used to further reduce the vehicle speed. However, in order to bring the vehicle to a full stop conventional friction brakes must be used.

On locomotive vehicles, particularly those of the prime mover electric drive type, operating in mountainous territory, retardation of the locomotive and train by the conventional air brake system results in rapid wheel and brake shoe wear. Dynamic braking systems for this type of service have been proposed, but no simple, low cost, trouble-free system has been developed on account of the limited available space on such locomotives for means of suitable size capable of continuously absorbing and dissipating the large values of kinetic energy of the locomotive and train by causing the traction motors to function as electrical generators supplying electrical energy to the energy absorbing and dissipating means.

The principal object of the present invention, therefore, is the provision of a simple, low cost, trouble-free dynamic braking system which is capable of retarding and limiting the speed of vehicles such as a locomotive and train during the descent of a long grade.

Another object is the provision of means requiring little space which is capable of absorbing and dissipating large quantities of electrical energy and which may be conveniently located on the locomotive without interfering with the existing power generating and driving equipment of the locomotive.

The means by which the above objects are accomplished, together with other objects and advantages provided by my simplified dynamic braking system, will be better understood by referring to the following detailed description and single accompanying drawing illustrating the invention.

The drawing shows in schematic form my invention as applied to a vehicle such as a locomotive of the prime mover electric drive type; however, it will be evident that the invention can be modified slightly for other uses.

Indicated on the drawing at M1 and M2 are conventional dynamo-electric machines or traction motors of the series type. The series field windings of these machines are indicated at F1 and F2 and the armatures thereof are indicated at A1 and A2. Each of the armatures is operatively connected in any well known manner to drive or be driven by individual wheels of the locomotive, not shown. A conventional power circuit arrangement is shown in the drawing by which the machines M1 and M2 may be connected in either a series or parallel relation to an electrical power source, indicated on the drawing but not shown, such as a conventional prime mover driven generator. This power circuit includes a series switch S for connecting the machines in series with the power source and parallel switches P1 and P2 for connecting the machines in parallel with the power source. Conventional reversing switches R1 and R2 are shown for reversing the polarity of the field windings F1 and F2 for obtaining forward or reverse operation of the locomotive.

Dynamic braking action by the machines M1 and M2 is obtained with the dynamic braking or load circuit arrangement shown by reversing the polarity of the field windings F1 and F2 of the machines and closure of the double pole switch indicated at B, which connects the machines M1 and M2 to heat transferring means shown at L for absorbing and dissipating the electrical energy generated by the machines M1 and M2 and constitutes an external electrical load for the machines.

The heat transferring means serves as energy dissipating and absorbing means and comprises resistor grids G1 and G2, a motor N operatively connected to drive a cooling fan C, and a duct D in which the grids are located and which is provided with openings 1, 2 and 3. The fan C is shown in the opening 1 and serves to force cooling air upward in the direction of the arrows for cooling the grids. The openings 2 and 3 face in opposite directions, one facing toward the forward end of the locomotive and the other facing toward the rear, so that cooling air enters through one of these openings and heated air leaves through the other, depending upon the direction of travel of the locomotive. The means L, therefore, serves as a self-cooled heat transferring energy absorbing and dissipating unit, which due to its small size may be located in the clerestory of the locomotive superstructure or body. The small size of the unit requires no rearrangement of the existing power generating or driving equipment of the locomotive, and it will be evident that if desired the walls of the clerestory may serve in place of the duct D when provided with suitable openings corresponding to the openings 1, 2 and 3 shows in the duct to allow entrance and exit of air for cooling the grids.

It will be evident that with the dynamic braking circuit arrangement shown upon closure of the switch B the grid G1 will be connected directly across the machine M1, and the grid G2 will be connected directly across the machine M2. The motor N driving the cooling fan C is shown permanently connected across the grid G1 and accordingly the grid G1 and motor N constitute the external electrical load on the machine M1 and provide means for dissipating and absorbing the electrical energy generated by the machine M1 when functioning as a generator and driven by one of the wheels of the locomotive. In like manner, the grid G2 constitutes the external electrical load on the machine M2 and provides means for dissipating and absorbing energy generated by this machine.

With the simplified dynamic braking circuit shown it is necessary that the polarity of the field windings F1 and F2 be reversed and the switch B be moved to the closed position in order to cause the machines to build up as generators. The value of the resistance in each of the external load circuits of the machines M1 and M2 is selected to obtain the proper rate of build-up in generated voltage of each machine. The voltage generated by each machine is proportional to the wheel speed or speed of the locomotive and the current in each circuit is proportional to the voltage and speed of the machines, as the resistance of the external circuits remains substantially constant. The braking force exerted by each machine on the respective wheels is proportional to the current flowing in the machines, so it will be evident that by selecting the proper value of resistance in the external circuit of the machines for a known weight of locomotive and train and a known grade, the braking force required to limit the speed of the locomotive and train to a given value may be calculated. As the braking force is directly proportional to the generated current and vehicle speed and the heating of the grids is proportional to the current flowing therethrough, the potential drop across the grid G1 and the voltage and current supplied to the motor N or the power absorbed by this motor in driving the fan C are proportional to the braking force and heating of the grids, and the speed of the motor N and the fan C is accordingly proportional to the heating of the grids. The amount of air delivered by the fan for cooling the grids, therefore, varies proportional to the heating of the grids, and accordingly the energy absorbed and dissipated by the motor N and grids G1 and G2 is proportional to the braking force and speed of the locomotive. It will be evident that if the speed of the locomotive and train increases above that of the calculated value, the braking force, current, heating of the grids and cooling air supplied thereto will increase, and by proper design of the motor N and fan C an excess of air may be supplied for an increase in the current flowing in the grids.

It is therefore evident that this simplified dynamic braking control system and compact self-cooled energy absorbing and dissipating means, in which the cooling air is supplied in proportion to the heating thereof and which requires little space on the locomotive, satisfies the requirements of a simple, trouble-free and inexpensive means of retarding locomotives and trains on long descending grades, and the means for connecting it with the machines requires very little change in the system necessary for the control of the power generating and driving equipment of the locomotive. In addition to the above features, by providing separate energy dissipating and absorbing means for each dynamo-electric machine the machines are loaded equally and equal values of dynamic braking force are exerted on individual wheels of the locomotive.

It will be apparent that for certain operating conditions or due to the particular arrangement of the power generating units on a locomotive, more air for cooling the grids will be required. To provide more cooling air a separate fan and motor may be used for each grid, the grid and motor being connected across an individual machine acting as a generator. A large fan may also be used which may be driven by a plurality of motors, each of which is connected to an individual grid connected to an individual machine.

On locomotives where groups of traction motors are connected to an individual grid and means are provided to insure equalization of the load between individual motors or groups of motors when functioning as generators, it will be obvious that the above described dynamic braking system may be modified to suit the particular type of motor connection employed.

I claim:

1. In a dynamic braking system for a vehicle, a plurality of dynamo-electric machines, each driven by an individual axle of the vehicle, separate means for imposing equal electrical loads on each of said machines to cause each to function as a generator and apply equal values of retarding torque to each axle of the vehicle, each of said means being adapted for absorbing and dissipating the energy generated by each machine and at least one of said means including a motor absorbing part of the generated energy, and a cooling fan driven thereby, and a duct enclosing all of said separate means and provided with openings for the passage of air in opposite directions upon either direction of movement of the vehicle and of the fan to cool said separate means, the air supplied by the fan being proportional to the energy generated and therefore the retarding torque on the vehicle axles.

2. In a dynamic braking system for a multi-wheeled vehicle, a plurality of traction motors operatively connected to individual vehicle wheels, means for imposing equal values of electrical load on each of said motors to cause said motors to function as generators and impose equal dynamic braking force on the individual wheels driving the motors, said means comprising a duct having a plurality of openings for free passage of a cooling medium irrespective of the direction of movement of the vehicle, a fan for circulating the medium in the duct, a plurality of resistance grids in the duct and a motor for driving the fan, and means for connecting said grids and motor to said traction motors in such manner that each grid is separately connected directly across a respective traction motor and the motor driving the fan is connected across a single grid so that equal values of resistance will be imposed on each of the motors to cause each motor to build up at the same rate and function in a stable manner as a generator, and said first named means is caused to serve as a self-cooled energy dissipating and absorbing unit occupying limited space on the vehicle.

STUART H. COWIN.